United States Patent
Gordon et al.

(10) Patent No.: US 6,604,882 B2
(45) Date of Patent: Aug. 12, 2003

(54) CABLE JOINING DEVICE WITH BREAKAWAY NUT

(75) Inventors: Larry Gordon, Lansdale, PA (US); Bob Zambelli, Souderton, PA (US)

(73) Assignee: Triumph Brands, Inc., Wayne, PA (US)

( * ) Notice: Subject to any disclaimer, the term of this patent is extended or adjusted under 35 U.S.C. 154(b) by 0 days.

(21) Appl. No.: 10/003,486

(22) Filed: Nov. 1, 2001

(65) Prior Publication Data

US 2003/0081986 A1 May 1, 2003

(51) Int. Cl.⁷ .................................................. F16B 31/02
(52) U.S. Cl. .......................... 403/2; 403/309; 403/314; 411/2; 24/122.6
(58) Field of Search .......................... 403/2, 300, 309, 403/313, 314; 24/122.3, 122.6, 135 R; 411/2, 3, 5

(56) References Cited

U.S. PATENT DOCUMENTS

| | | | |
|---|---|---|---|
| 255,103 A | 3/1882 | Deschamps | |
| 278,346 A | 2/1883 | Long | |
| 394,680 A | 12/1888 | Dawes | |
| 746,360 A | 12/1903 | McAdams | |
| 1,248,974 A | 12/1917 | Witherell | |
| 1,258,580 A | 3/1918 | Lassiter | |
| 1,390,830 A | 9/1921 | Snow | |
| 1,500,921 A | 7/1924 | Bramson et al. | |
| 1,528,967 A | 3/1925 | Bersted | |
| 1,626,138 A | 4/1927 | Kohn | |
| 2,064,440 A | * 12/1936 | Meeker | 403/314 X |
| 2,209,673 A | 7/1940 | Bratz | |
| 2,297,813 A | 2/1942 | Stork | |
| 2,335,455 A | 2/1943 | Scott | |
| 2,339,488 A | * 1/1944 | Kratoville | 24/122.6 X |
| 2,446,542 A | 2/1948 | MacInnes | |
| 2,463,145 A | * 3/1949 | Buchanan | 403/314 X |
| 2,499,030 A | 2/1950 | Moon | |
| 2,586,268 A | 2/1952 | Smith | |
| 2,615,074 A | 2/1952 | Bronovicki | |
| 2,753,586 A | 7/1956 | Metz | |
| 2,893,540 A | 2/1959 | Freeman | |
| 2,923,566 A | 2/1960 | Burhop | |
| 2,957,353 A | 2/1960 | Babacz | |
| 3,045,609 A | 2/1962 | Brown | |
| 3,033,600 A | 5/1962 | Drysdale | |
| 3,218,880 A | 11/1965 | Bentley | |
| 3,237,977 A | 3/1966 | Bachelder | |
| 3,367,616 A | 2/1968 | Bausch et al. | |
| 3,429,197 A | 2/1969 | Loewenstern | |
| 3,468,569 A | 9/1969 | Ballard et al. | |
| 3,512,447 A | * 5/1970 | Vaughn | 411/5 |
| 3,625,084 A | 12/1971 | Low | |
| 3,825,356 A | 7/1974 | Crook, Jr. | |
| 3,852,850 A | 12/1974 | Filhaber | |
| 4,172,676 A | 10/1979 | DeChant | |
| 4,195,798 A | 4/1980 | Costantino et al. | |
| 4,225,258 A | 9/1980 | Thompson | |
| 4,290,762 A | 9/1981 | Lapeyre | |

(List continued on next page.)

Primary Examiner—Lynne H. Browne
Assistant Examiner—Ryan Flandro
(74) Attorney, Agent, or Firm—Dann Dorfman Herrell and Skillman, P.C.

(57) ABSTRACT

An internally threaded (23) collet nut (22) is placed onto the first cable (12) and a first cable (12) is inserted into a collapsible collet (20) on a connector body (18). The collet nut (22) and a breakaway nut (30) are engaged with simple wrenches to establish a reactive torque between the collet nut (22) and the breakaway nut (34) to break away the breakaway nut (34) from the connector body. An enlarged end (16) of the second cable (14) is placed into the interior of a retainer nut (30), which is threaded onto the threaded section (19) of the connector body (18) to abut the collet nut (22), thereby connecting the two cables (12 and 14).

6 Claims, 1 Drawing Sheet

U.S. PATENT DOCUMENTS

| | | | |
|---|---|---|---|
| 4,365,906 A | * 12/1982 | King | 403/2 |
| 4,427,326 A | * 1/1984 | Hobson et al. | 411/5 |
| 4,509,387 A | 4/1985 | Tschanz et al. | |
| 4,513,857 A | 4/1985 | Leach | |
| 4,627,762 A | 12/1986 | Scotti | |
| 4,678,360 A | 7/1987 | Miller | |
| 4,767,231 A | 8/1988 | Wallis | |
| 4,850,084 A | 7/1989 | Iwasaki | |
| 4,863,133 A | 9/1989 | Bonnell | |
| 4,887,929 A | 12/1989 | Hale | |
| 5,074,162 A | 12/1991 | Yanusko | |
| 5,129,844 A | * 7/1992 | Goto et al. | 411/2 X |
| 5,138,898 A | 8/1992 | Pospisil et al. | |
| 5,159,849 A | 11/1992 | Womack | |
| 5,193,932 A | * 3/1993 | Wu | 403/309 X |
| 5,197,348 A | 3/1993 | Womack | |
| 5,228,875 A | 7/1993 | Swenson, Sr. | |
| 5,246,303 A | 9/1993 | Trilla et al. | |
| 5,381,706 A | 1/1995 | Yanusko et al. | |
| 5,426,995 A | 6/1995 | Maennle | |
| 5,518,097 A | 5/1996 | Dabin | |
| 5,658,017 A | * 8/1997 | Chirehdast et al. | 411/3 X |
| 5,695,297 A | 12/1997 | Geib | |
| 5,794,488 A | 8/1998 | Yanusko | |
| 5,831,706 A | 11/1998 | Lyu | |
| 5,836,061 A | 11/1998 | Castillo et al. | |
| 6,085,611 A | 7/2000 | Valdez | |
| 6,113,303 A | 9/2000 | Buhl et al. | |

* cited by examiner

CABLE JOINING DEVICE WITH BREAKAWAY NUT

BACKGROUND OF THE INVENTION

1. Field of the Invention

The subject invention relates to motion transmitting remote control cable assemblies of the type for transmitting motion in a curved path by a flexible motion transmitting core element or cable. More specifically, the invention relates to a connector for connecting two cables.

2. Description of the Prior Art

The cable assemblies of the type to which this invention pertains are used to remotely actuate various mechanisms in facilities and vehicles, including automobiles, boats and aircraft. Such cable assemblies frequently use a multi-stranded cable as the core element for transmitting motion. These cables frequently need to be replaced or repaired due to fraying, elongation or fracture.

Various connectors are known in the prior art for connecting two cable ends, such as those shown in U.S. Pat. No. 1,258,580 to Lassiter, U.S. Pat. No. 3,852,850 to Filhaber, U.S. Pat. No. 4,678,360 to Miller, U.S. Pat. No. 4,850,084 to Iwasaki, U.S. Pat. No. 5,138,898 to Pospisil et al., U.S. Pat. No. 5,228,875 to Swenson and U.S. Pat. No. 6,085,611 to Valdez.

However, there remains a need for a connector that may be used in cramped or close quarters and using the simplest of hand tools.

SUMMARY OF THE INVENTION AND ADVANTAGES

A connector assembly for connecting first and second cables wherein a body has first and second ends with a collet at the first end for gripping the first cable and a pocket at the second end for receiving an enlarged end of the second cable. A collet nut is included for engaging the body and forcing the collet into gripping engagement with the first cable. A retainer nut engages the body and retains the second cable in the pocket.

The invention also provides a method of connecting a first cable to a second cable having an enlarged end by placing an internally threaded collet nut onto the first cable and inserting the first cable into a collapsible collet on a first end of a connector body followed by threading the collet nut onto a threaded section of the connector body. The collet nut is tightened to establish a predetermined torque between the collet nut and a breakaway nut at the second end of the connector to break away the breakaway nut and provide access to the threaded section of the body. The enlarged end of the second cable is placed into the interior of a retainer nut and the retainer nut is threaded onto the threaded section of the connector body.

Accordingly, the invention provides a connector that may be used to connect two cables in a very cramped space with simple tools yet allowing the enlarged end of the first cable to disconnected by unthreading the retainer nut. When made of plastic material, the connector is lightweight and corrosion resistant.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
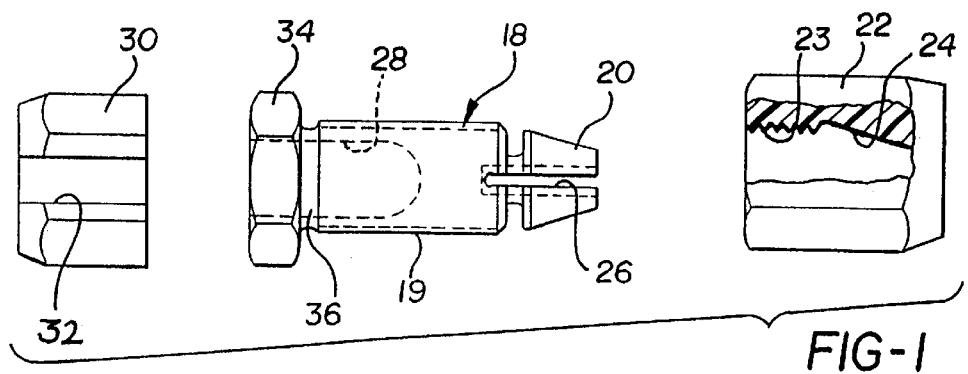
FIG. 1 is an enlarged and exploded side view of the connector of the subject invention.
Figure 2:
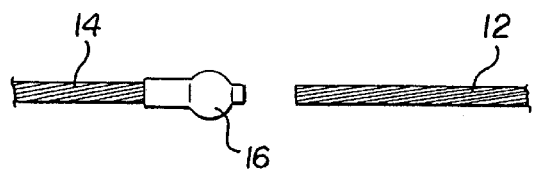
FIG. 2 is a side view of two cables to be connected by the subject invention.
Figure 3:
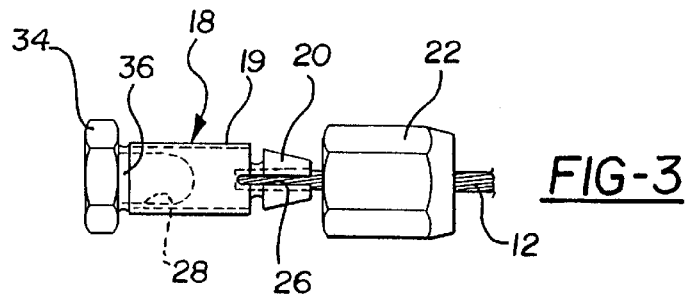
FIG. 3 is a side view of connecting the first cable 12 to the connector.

Referring to the Figures, wherein like numerals indicate like or corresponding parts throughout the several views, a connector assembly is shown in FIG. 1 for connecting first 12 and second 14 cables. The first cable 12 is of the multi-stranded type and merely presents a cut end whereas the second cable 14 has an enlarged end 16 defined by a slug swaged, crimped, soldered, or the like, to the multi-stranded second cable 14.

The connector includes a body 18, generally indicated at 18, having first and second ends with a male threaded section 19 between the ends. A collet 20 is disposed at the first end for gripping the first cable 12. The collet 20 has a conical exterior and includes a central bore for engaging the first cable 12. A collet nut 22 is included for engaging the body 18 and includes a length of threads 23 and a female conical recess 24 for forcing the collet 20 into gripping engagement with the first cable 12. To accommodate the gripping action, the collet 20 includes collet slots 26 for allowing collapse of the collet 20 in response to axial movement of the conical recess 24 onto the conical collet 20 as the collet nut 22 is threaded onto the threaded section 19 of the body 18.

Figure 5:
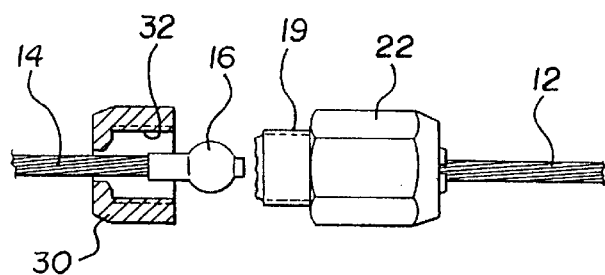
FIG. 5 is a side view of the second cable 14 being connected to the retainer nut.

A pocket 28 is disposed at the second end of the connector body 18 for receiving the enlarged end 16 of the second cable 14. A retainer nut 30 is included for engaging the body 18 and retaining the second cable 14 in the pocket 28. The retainer nut 30 includes a length of threads disposed in an internal female pocket for threadedly engaging the threaded section 19 of the connector body 18. Accordingly, both of the collet and retainer nuts 22, 30 include a length of threads that threadedly engage the single threaded section 19 on the connector body 18. In addition, the retainer nut 30 includes a radial slot 32 for receiving the second cable 14. In other words, the cable is moved radially into the slot 32 while the enlarged end 16 is held outside the retainer nut 30, as illustrated in FIG. 5.

Figure 4:
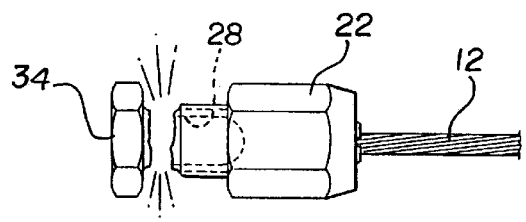
FIG. 4 is a side view of the breakaway nut being separated from the connector body 18.

The body 18 includes a breakaway nut 34 at the second end for breaking away (as illustrated in FIG. 4) in response to a predetermined torque between the collet nut 22 and the breakaway nut 34.

An assembly as set forth in claim 3 wherein the body 18 includes a breakaway nut 34 at the second end for breaking away in response to a predetermined torque between the collet nut 22 and the breakaway nut 34 to provide access to the threaded section 19 of the body 18 by the retainer nut 30. The breakaway nut 34 is formed integrally with the connector body 18 through a neck section 36 which fractures in response to the predetermined torque between the collet nut 22 and the breakaway nut 34. The entire assembly is preferably molded of an organic polymeric material to facilitate such fracture and to provide corrosion resistance.

Figure 6:
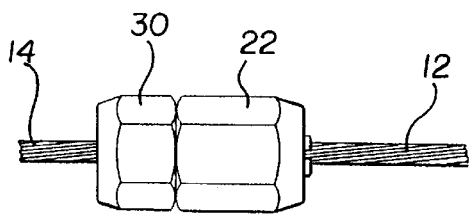
FIG. 6 is a side view of the retainer nut threaded onto the connector body 18.

The length of the threaded section 19 matches the combined length of threads and collet 20 and retainer 30 nuts so that the collet 20 and retainer 30 nuts abut one another when fully threaded onto the threaded section 19 of the body 18, as illustrated in FIG. 6.

As will be appreciated, the invention provides a method of connecting a first cable 12 to a second cable 14 having an enlarged end 16. The method comprises the steps of placing the internally threaded collet nut 22 onto the first cable 12 and inserting the first cable 12 into the collapsible collet 20 on the first end of the connector body 18, followed by threading the collet nut 22 onto the threaded section 19 of the connector body 18.

By engaging the collet nut 22 and the breakaway nut 30 with simple wrenches, a reactive torque is established between the collet nut 22 and the breakaway nut 34 at the second end of the connector to break away or fracture the breakaway nut 34 from the connector body 18 in response to a predetermined torque between the collet nut 22 and the breakaway nut 34 to provide access to the threaded section 19 of the body 18.

This is followed by placing the enlarged end 16 of the second cable 14 into the interior of a retainer nut 30 and threading the retainer nut 30 onto the threaded section 19 of the connector body 18. As alluded to above, the retainer nut 30 is threaded onto the threaded section 19 of the connector body 18 to abut the collet nut 22.

Obviously, many modifications and variations of the present invention are possible in light of the above teachings. The reference numerals in the claims are merely for convenience and are not to be read in any way as limiting.

What is claimed is:

1. A connector assembly for connecting first and second cables and comprising:
    a body having first and second ends,
    a collet at said first end for gripping the first cable,
    a pocket at said second end for receiving an enlarged end of the second cable,
    a collet nut for engaging said body and forcing said collet into gripping engagement with the first cable,
    and a retainer nut for engaging said body and retaining the second cable in said pocket; said collet and retainer nuts each include a length of threads and said body includes a male threaded section for threaded engagement with said threads of said collet nut and said threads of said retainer nut; said body includes a breakaway nut at said second end for breaking away in response to a predetermined torque between said collet nut and said breakaway nut to provide access to said threaded section of said body by said retainer nut.

2. The assembly as set forth in claim 1 wherein said retainer nut includes an internally threaded pocket for engaging said threaded section and a radial slot for receiving said second cable.

3. The assembly as set forth in claim 2 wherein the length of said threaded section matches the combined length of threads of said collet 20 and retainer nuts so that said collet and retainer nuts abut one another when fully threaded onto said threaded section of said body.

4. The assembly as set forth in claim 3 wherein said collet nut includes a female conical recess and said collet is conical and includes a central bore for engaging the first cable and collet slots for allowing collapse of said collet in response to axial movement of said conical recess onto said conical collet as said collet nut is threaded onto said threaded section of said body.

5. A method of connecting a first cable to a second cable having an enlarged end and comprising the steps:
    placing an internally threaded collet nut onto the first cable, inserting the first cable into a collapsible collet on a first end of a connector body, threading the collet nut onto a threaded section of the connector body, establishing a reactive torque between the collet nut and a breakaway nut at a second end of the connector body and breaking away the breakaway nut in response to a predetermined torque between the collet nut and the brekaway nut to provide access to the threaded section of the body, placing the enlarged end of the second cable into the interior of a retainer nut, threading the retainer nut onto the threaded section of the connector body.

6. The method as set forth in claim 5 including threading the retainer nut onto the threaded section of the connector body to abut the collet nut.

\* \* \* \* \*